US010841195B2

(12) United States Patent
Johnsen et al.

(10) Patent No.: US 10,841,195 B2
(45) Date of Patent: *Nov. 17, 2020

(54) SYSTEM AND METHOD FOR CONTROLLED RE-CABLING AND LINK TESTING FOR SWITCHES AND SWITCH PORTS IN A HIGH PERFORMANCE COMPUTING NETWORK

(71) Applicant: ORACLE INTERNATIONAL CORPORATION, Redwood Shores, CA (US)

(72) Inventors: Bjørn Dag Johnsen, Oslo (NO); Dag Georg Moxnes, Oslo (NO); Line Holen, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/847,610

(22) Filed: Dec. 19, 2017

(65) Prior Publication Data

US 2018/0234330 A1 Aug. 16, 2018

Related U.S. Application Data

(60) Provisional application No. 62/457,581, filed on Feb. 10, 2017.

(51) Int. Cl.
*H04L 12/26* (2006.01)
*H04L 12/24* (2006.01)

(52) U.S. Cl.
CPC .............. *H04L 43/50* (2013.01); *H04L 41/12* (2013.01); *H04L 43/0811* (2013.01); *H04L 41/0816* (2013.01)

(58) Field of Classification Search
None
See application file for complete search history.

(56) References Cited

U.S. PATENT DOCUMENTS

| 6,434,716 | B1* | 8/2002 | Johnson | G01R 31/31915 370/213 |
| 2004/0030763 | A1* | 2/2004 | Manter | H04L 41/044 709/223 |
| 2004/0090925 | A1 | 5/2004 | Schoeberl et al. | |
| 2006/0117089 | A1* | 6/2006 | Karam | H04L 1/22 709/208 |
| 2009/0216853 | A1* | 8/2009 | Burrow | H04L 41/12 709/208 |
| 2010/0077067 | A1* | 3/2010 | Strole | G06F 15/17393 709/223 |

(Continued)

OTHER PUBLICATIONS

United States Patent and Trademark Office, Office Action dated Mar. 21, 2018 for U.S. Appl. No. 13/488,221, 23 Pages.

*Primary Examiner* — Noel R Beharry
*Assistant Examiner* — Rodrick Mak
(74) *Attorney, Agent, or Firm* — Tucker Ellis LLP

(57) ABSTRACT

Systems and methods can provide a switch mode that is similar to "boot in progress", but that is admin (e.g., administrator) controllable. This mode can ensure that an admin can perform re-cabling and cable test operations for any single switch in an operational subnet (e.g., an InfiniBand subnet) without causing unnecessary subnet re-routing and re-configuration operations.

20 Claims, 20 Drawing Sheets

(56) References Cited

U.S. PATENT DOCUMENTS

| | | | | |
|---|---|---|---|---|
| 2012/0044948 A1* | 2/2012 | Nachum | ............. | H04L 12/4641 370/401 |
| 2014/0089492 A1* | 3/2014 | Nelson | ................. | H04L 67/325 709/224 |
| 2017/0041201 A1* | 2/2017 | Ilyadis | .................... | H04L 43/08 |

* cited by examiner

```
┌─────────────────────────────────────────────────────────────┐
│ Provide, at one or more computers, including one or more    │
│ microprocessors, a first subnet, the first subnet comprising one or more │
│ switches, the one or more switches comprising at least a leaf switch, │
│ wherein each of the one or more switches comprise a plurality of switch │
│ ports, a plurality of host channel adapters, wherein each of the host │
│ channel adapters comprise at least one virtual function, at least one │
│ virtual switch, and at least one physical function, and wherein the │
│ plurality of host channel adapters are interconnected via the one or │
│ more switches, a plurality of hypervisors, wherein each of the plurality of │  1310
│ hypervisors are associated with at least one host channel adapter of the │
│ plurality of host channel adapters, a plurality of virtual machines, │
│ wherein each of the plurality of virtual machines are associated with at │
│ least one virtual function, and a subnet manager, the subnet manager │
│ running on one of the one or more switches and the plurality of host │
│ channel adapters.                                           │
└─────────────────────────────────────────────────────────────┘
                              │
                              ▼
┌─────────────────────────────────────────────────────────────┐
│ Configure a switch port of the plurality of switch ports on a switch of the │  1320
│ one or more switches as a router port.                      │
└─────────────────────────────────────────────────────────────┘
                              │
                              ▼
┌─────────────────────────────────────────────────────────────┐
│ Logically connect the switch port configured as the router port is to a │
│ virtual router, the virtual router comprising at least two virtual router │  1330
│ ports.                                                      │
└─────────────────────────────────────────────────────────────┘
```

FIGURE 13

```
┌─────────────────────────────────────────────────────────────────────────┐
│ Providing, at the one or more computers, including one or more          │
│ microprocessors a first subnet, the first subnet comprising a plurality │
│ of switches, the plurality of switches comprising at least a leaf       │
│ switch, wherein each of the plurality of switches comprise a plurality  │
│ of switch ports, a plurality of host channel adapters, wherein each of  │
│ the host channel adapters comprise at least one virtual function, at    │
│ least one virtual switch, and at least one physical function, and       │
│ wherein the plurality of host channel adapters are interconnected via   │  ~1710
│ the plurality of switches, a plurality of hypervisors, wherein each of  │
│ the plurality of hypervisors are associated with at least one host      │
│ channel adapter of the plurality of host channel adapters, a plurality  │
│ of virtual machines, wherein each of the plurality of virtual machines  │
│ are associated with at least one virtual function, and a subnet         │
│ manager, the subnet manager running on one of the plurality of          │
│ switches and the plurality of host channel adapters.                    │
└─────────────────────────────────────────────────────────────────────────┘
                                    ↓
┌─────────────────────────────────────────────────────────────────────────┐
│ Resetting a switch of the plurality of switches.                        │  ~1720
└─────────────────────────────────────────────────────────────────────────┘
                                    ↓
┌─────────────────────────────────────────────────────────────────────────┐
│ Upon the reset of the switch of the plurality of switches, associating  │
│ the switch with a boot attribute, the boot attribute being accessible,  │  ~1730
│ via a subnet management packet, by at least the subnet manager.         │
└─────────────────────────────────────────────────────────────────────────┘
```

FIGURE 17

SYSTEM AND METHOD FOR CONTROLLED
RE-CABLING AND LINK TESTING FOR
SWITCHES AND SWITCH PORTS IN A HIGH
PERFORMANCE COMPUTING NETWORK

CLAIM OF PRIORITY

This application claims the benefit of priority to U.S. Provisional Application titled "SYSTEM AND METHOD FOR CONTROLLED RE-CABLING AND LINK TESTING FOR SWITCHES AND SWITCH PORTS IN AN INFINIBAND NETWORK", Application No. 62/457,581, filed on Feb. 10, 2017.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting computer system controlled re-cabling and link testing for switches and switch ports in a network environment.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are systems methods for supporting controlled re-cabling and link testing for switches and switch ports in a high performance computing environment, such as an InfiniBand™ network, in accordance with an embodiment.

In accordance with an embodiment, an exemplary method is disclosed for supporting controlled re-cabling and link testing for switches and switch ports in a high performance computing environment, in accordance with an embodiment. The method can provide, at one or more computers, including one or more microprocessors a first subnet, the first subnet comprising a plurality of switches, the plurality of switches comprising at least a leaf switch, wherein each of the plurality of switches comprise a plurality of switch ports, a plurality of host channel adapters, the plurality of host channel adapters providing connectivity to the subnet for a plurality of hosts; a subnet manager, the subnet manager running on one of the plurality of switches and the plurality of host channel adapters. The method can undergo, by at least one switch port of a switch of the plurality of switches, one of link testing or re-cabling. Upon the at least one switch port of a switch of the plurality of switches undergoing one of link testing or re-cabling, the method can associate the switch of the plurality of switches with a controllable mode.

BRIEF DESCRIPTION OF THE FIGURES

FIG. 13 shows a flowchart of a method for supporting dual-port virtual router in a high performance computing environment, in accordance with an embodiment.

FIG. 17 is a flowchart of a method for supporting coordinated link up handling following a switch reset in a high performance computing environment, in accordance with an embodiment.

DETAILED DESCRIPTION

Figure 1:
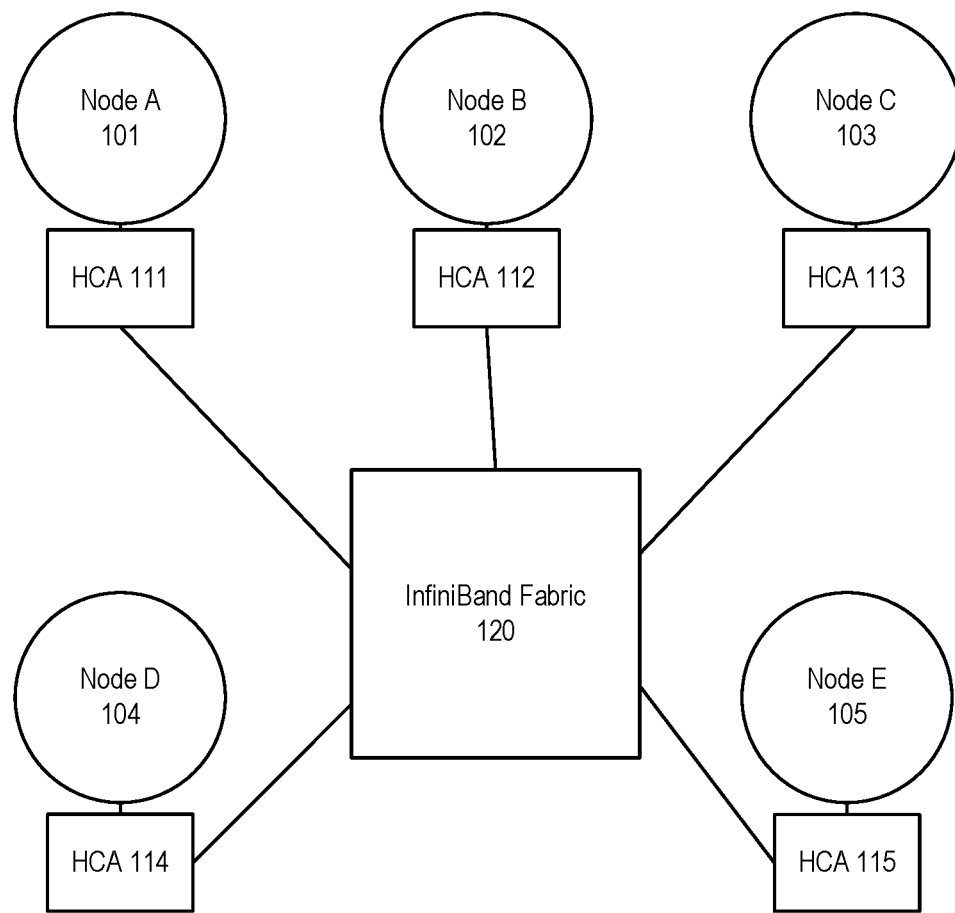
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for systems methods for supporting controlled re-cabling and link testing for switches and switch ports in a high performance computing environment.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
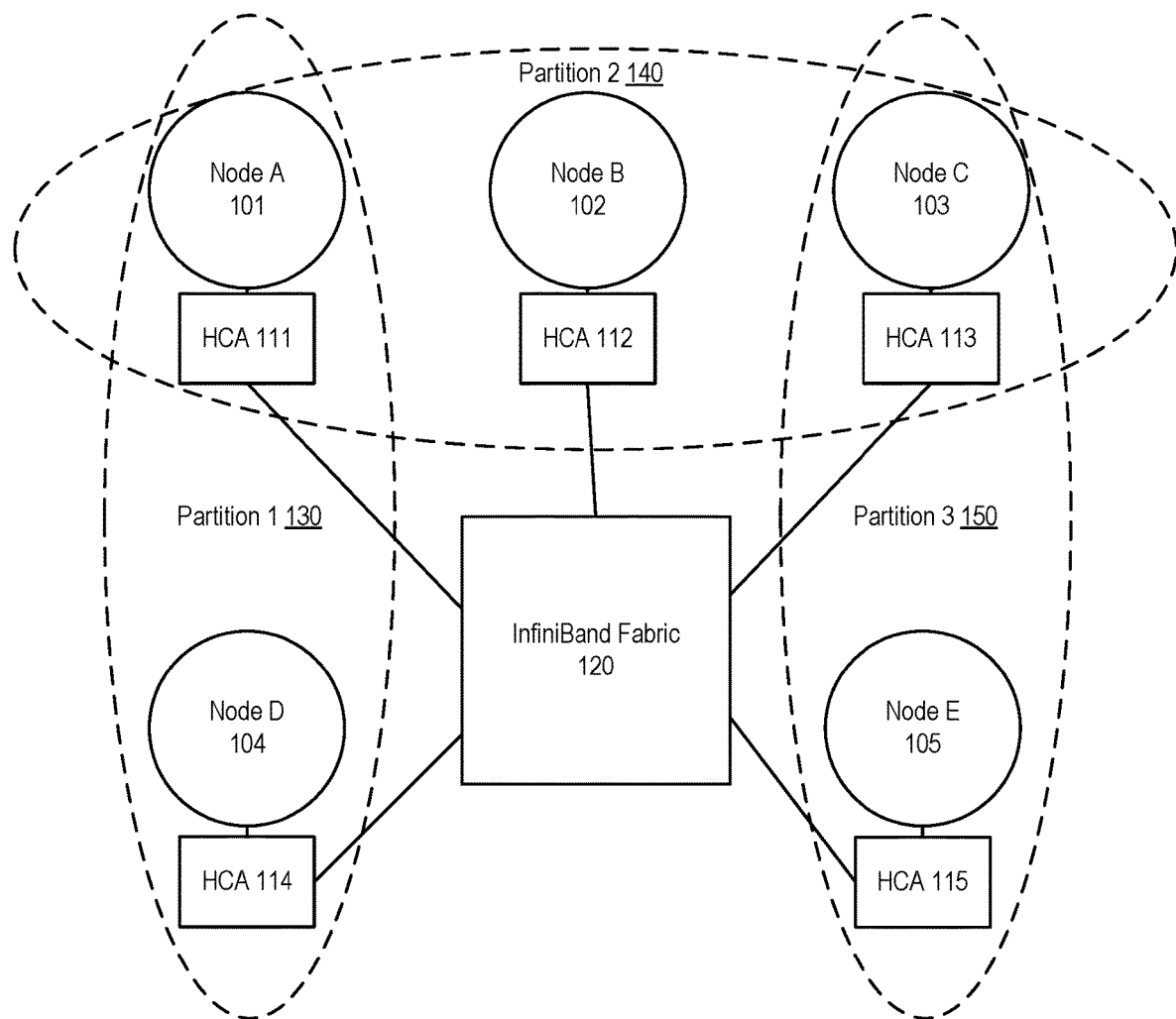
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
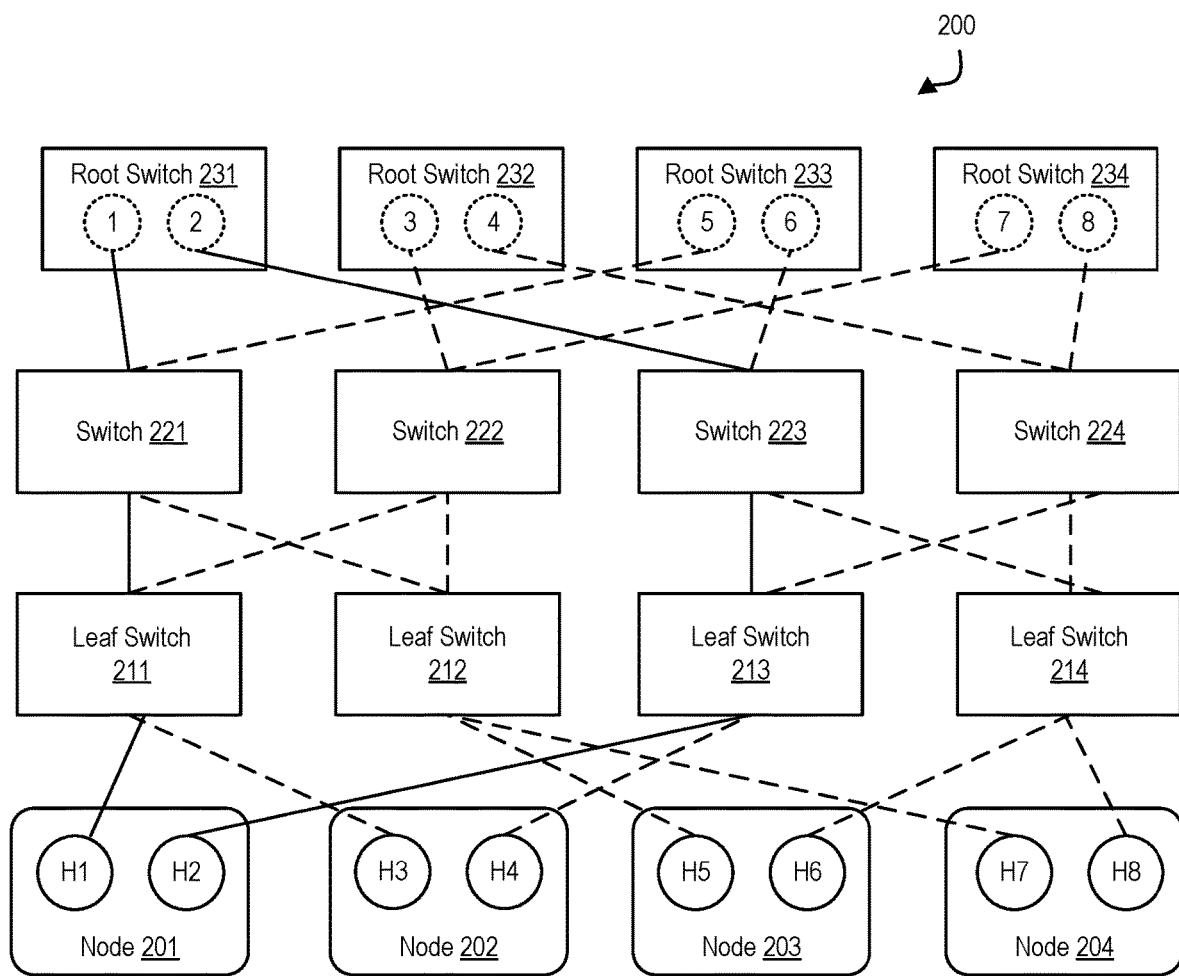
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
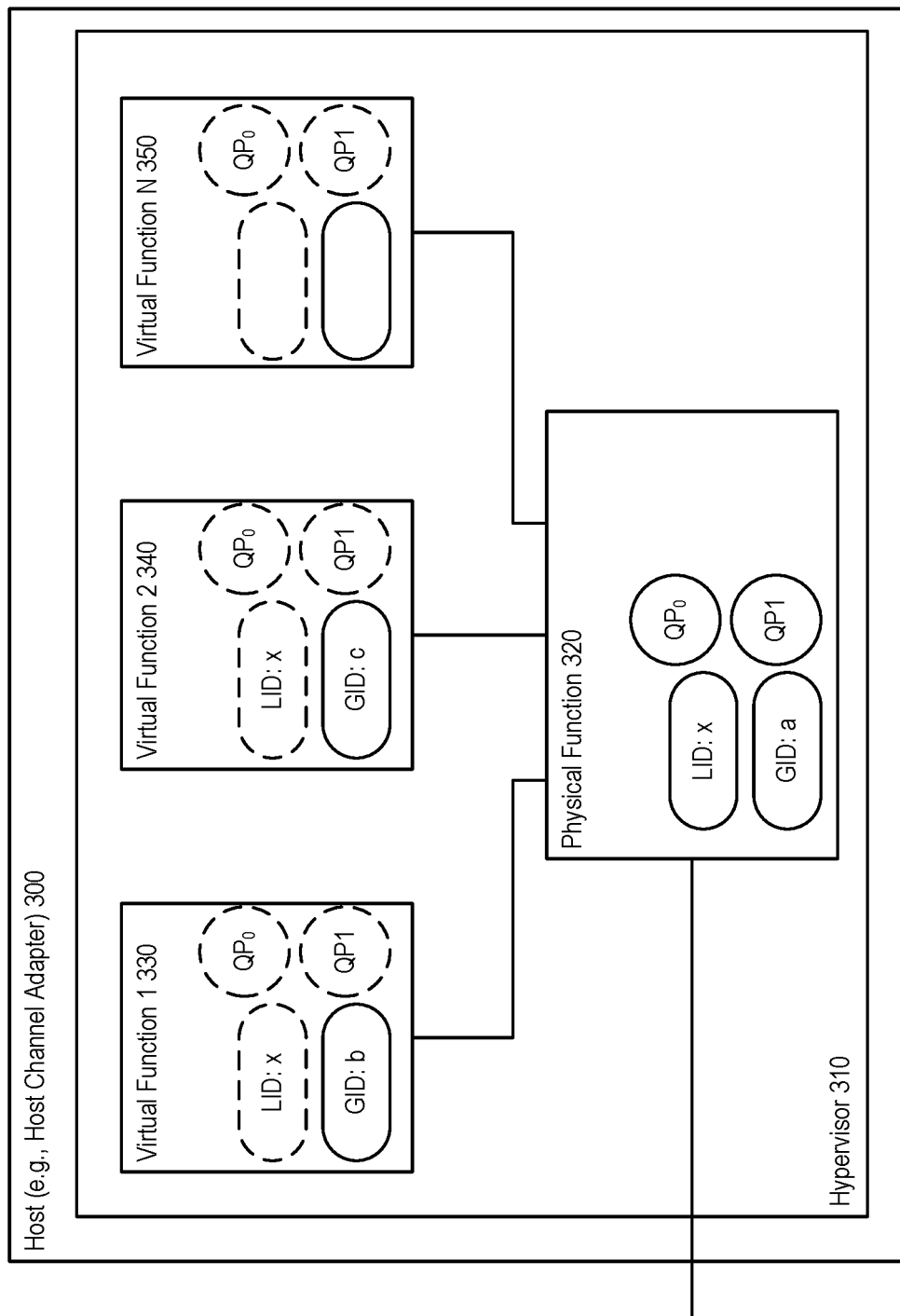
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
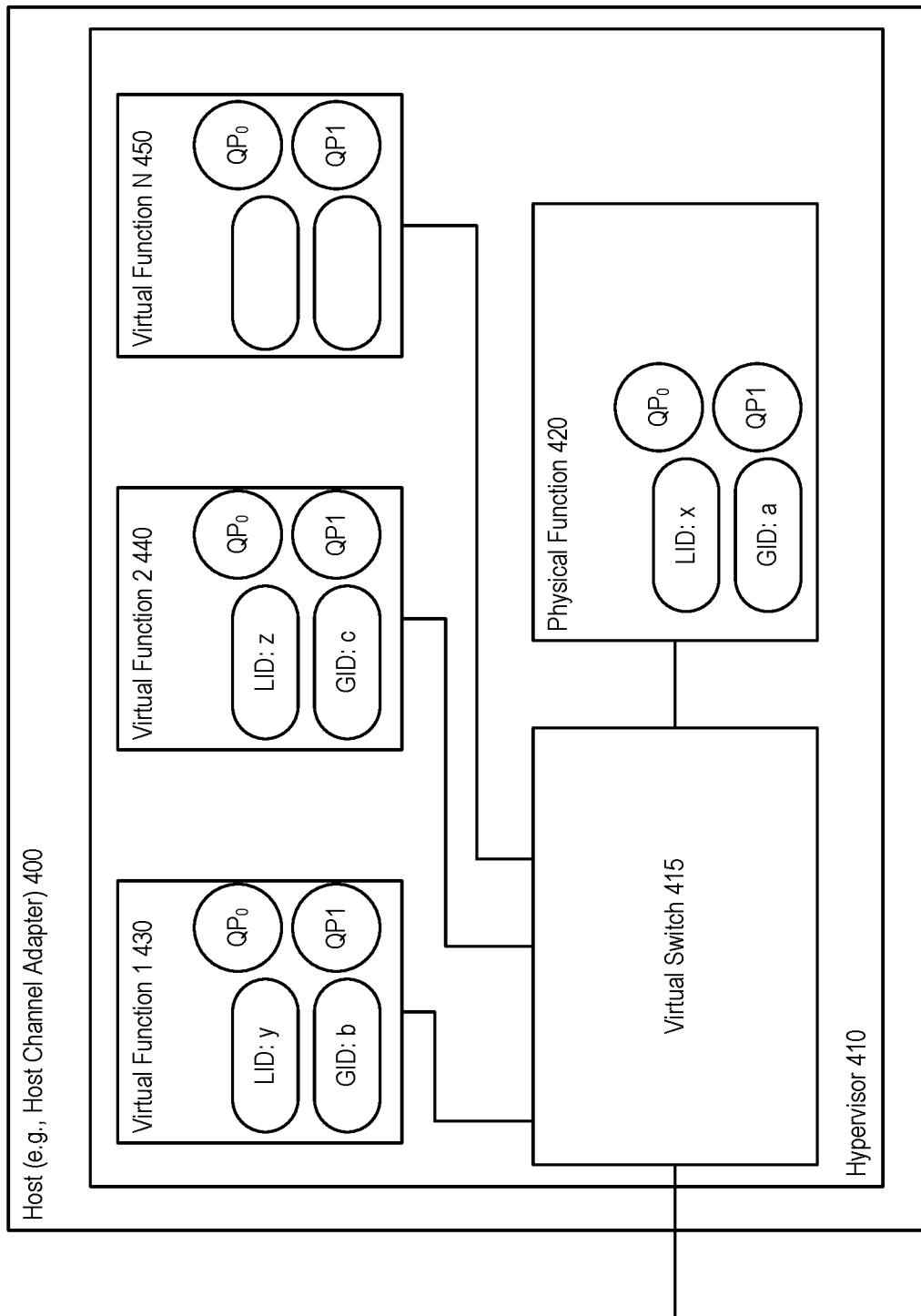
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
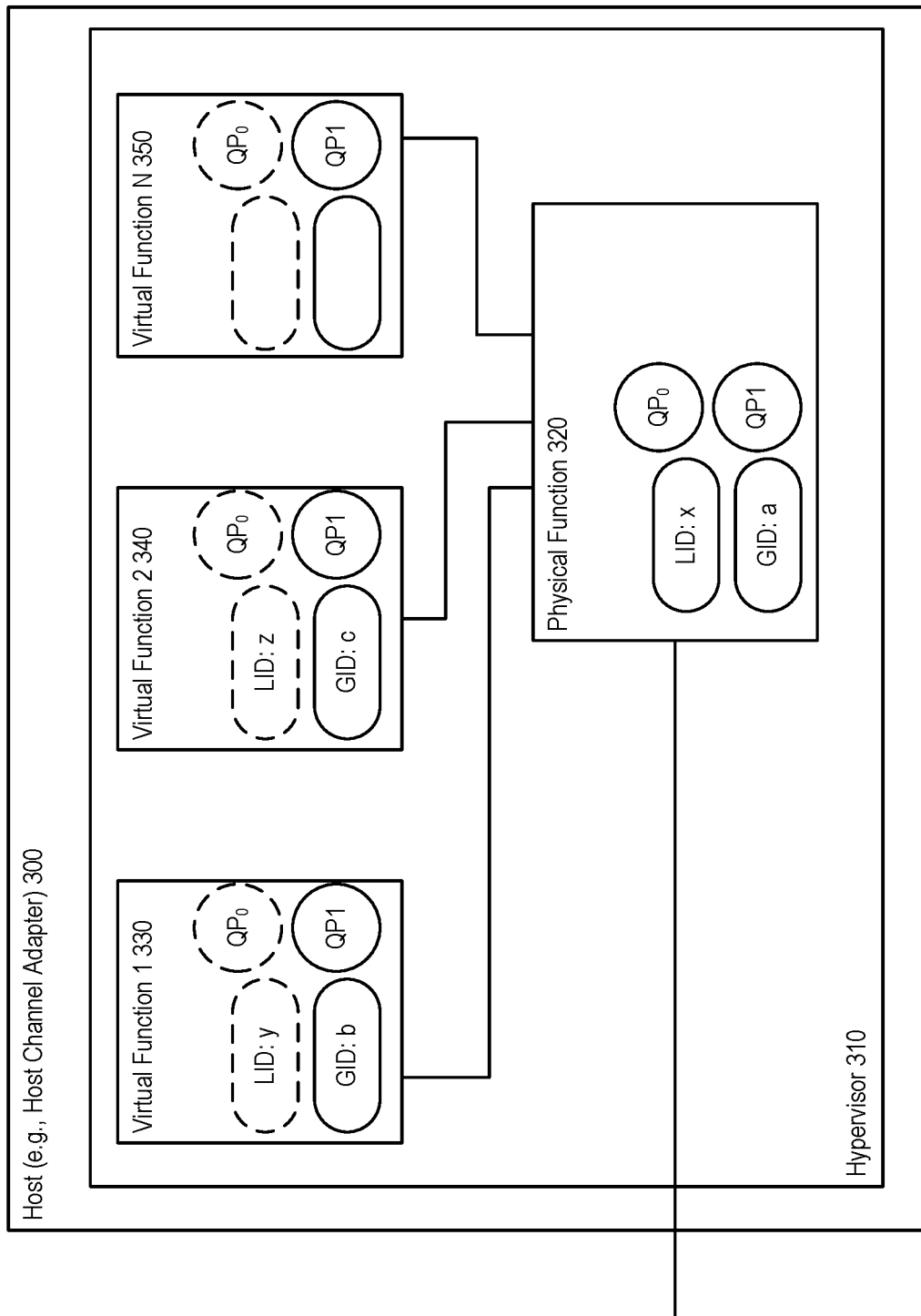
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
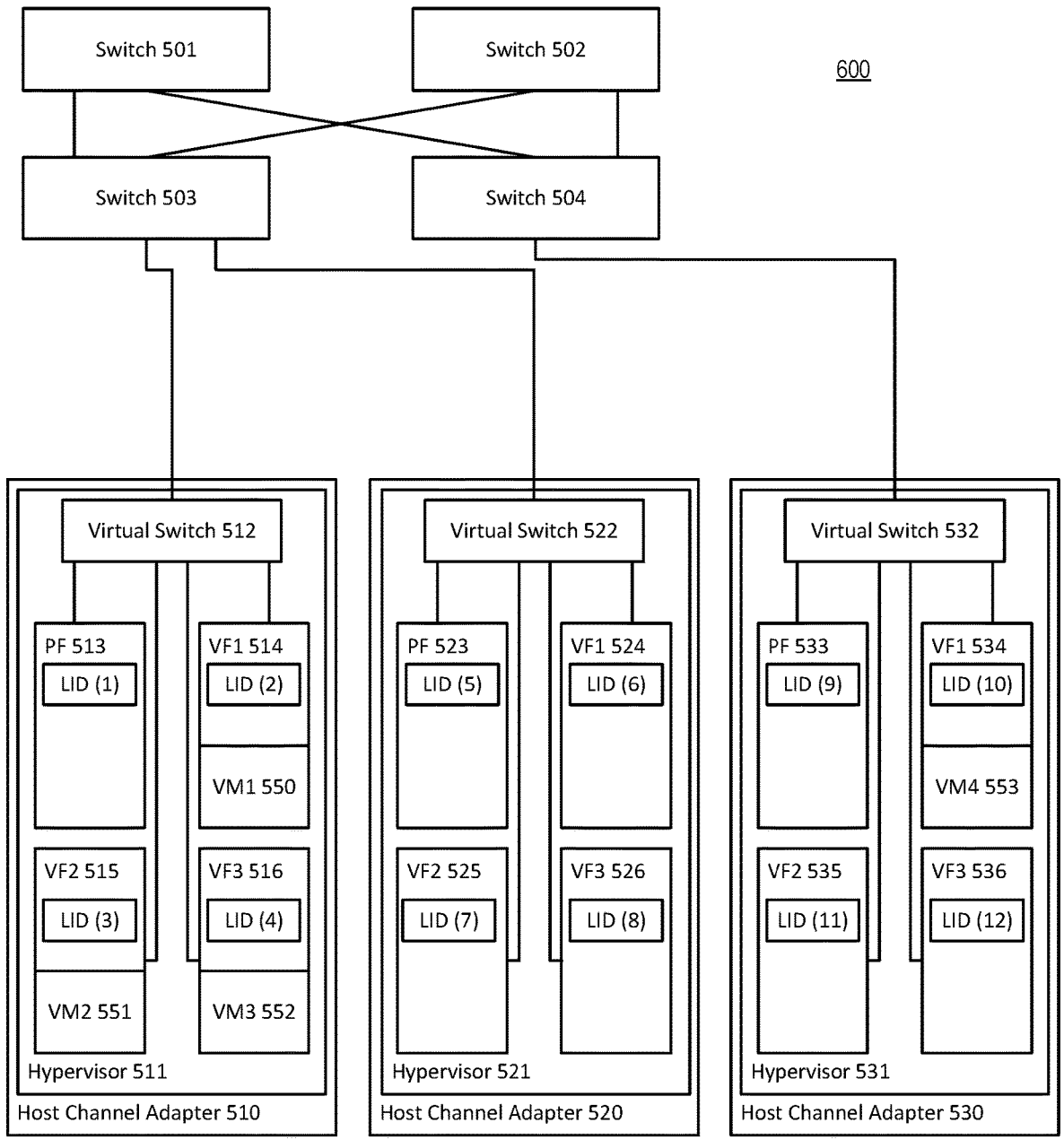
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 5, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 5.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
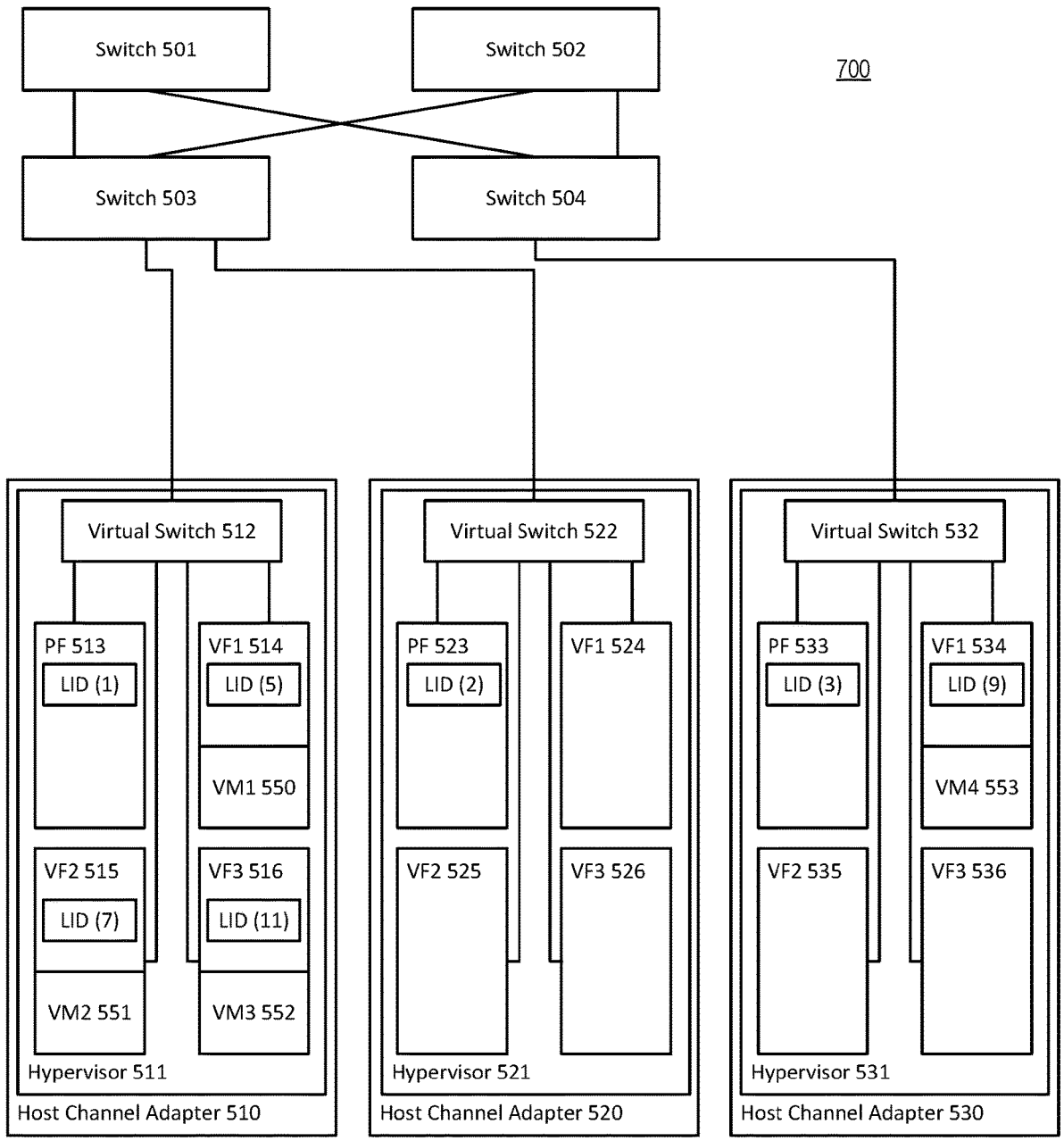
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 7, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
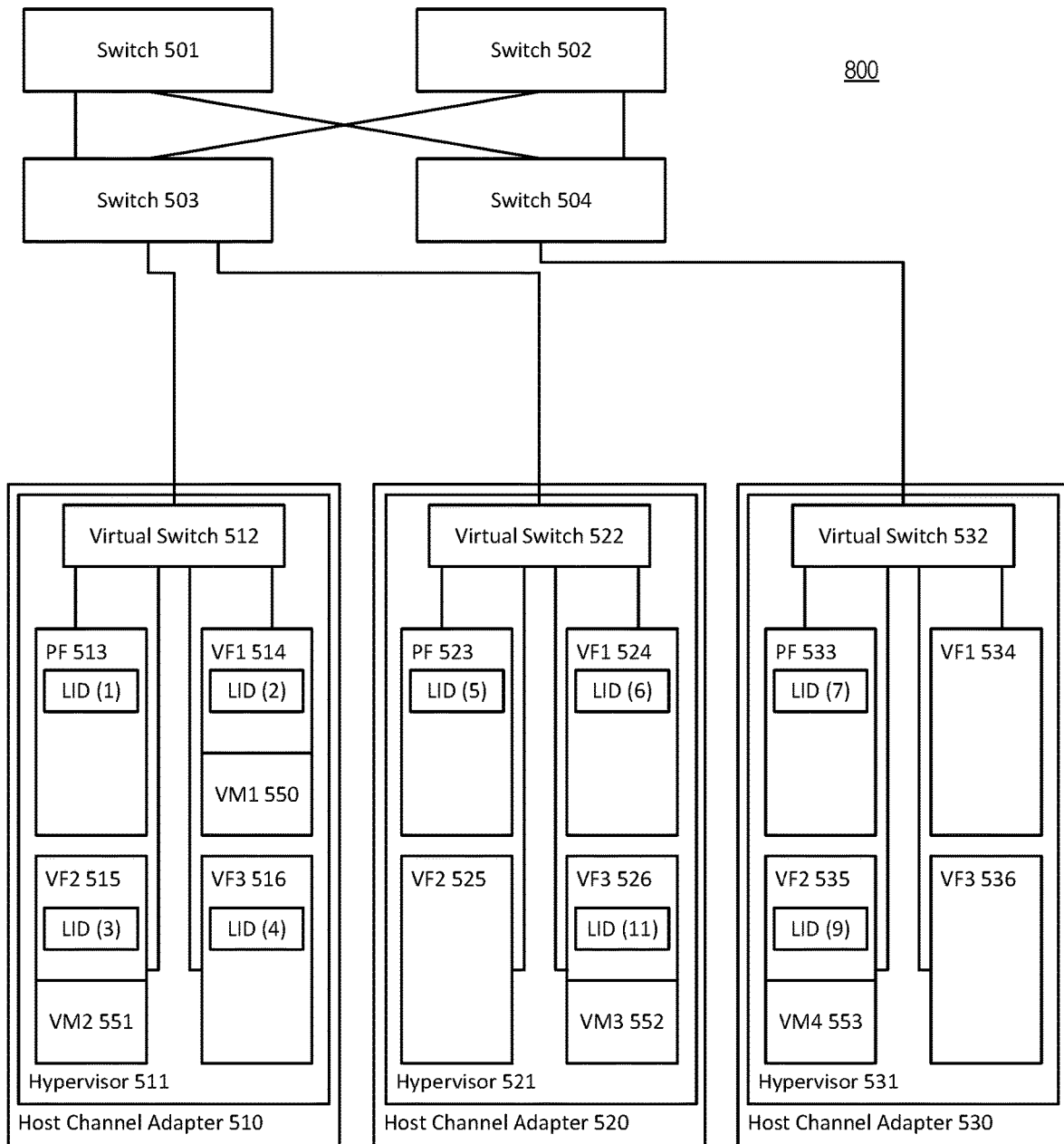
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 7, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 8, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0⇐prepopulated VFs⇐Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
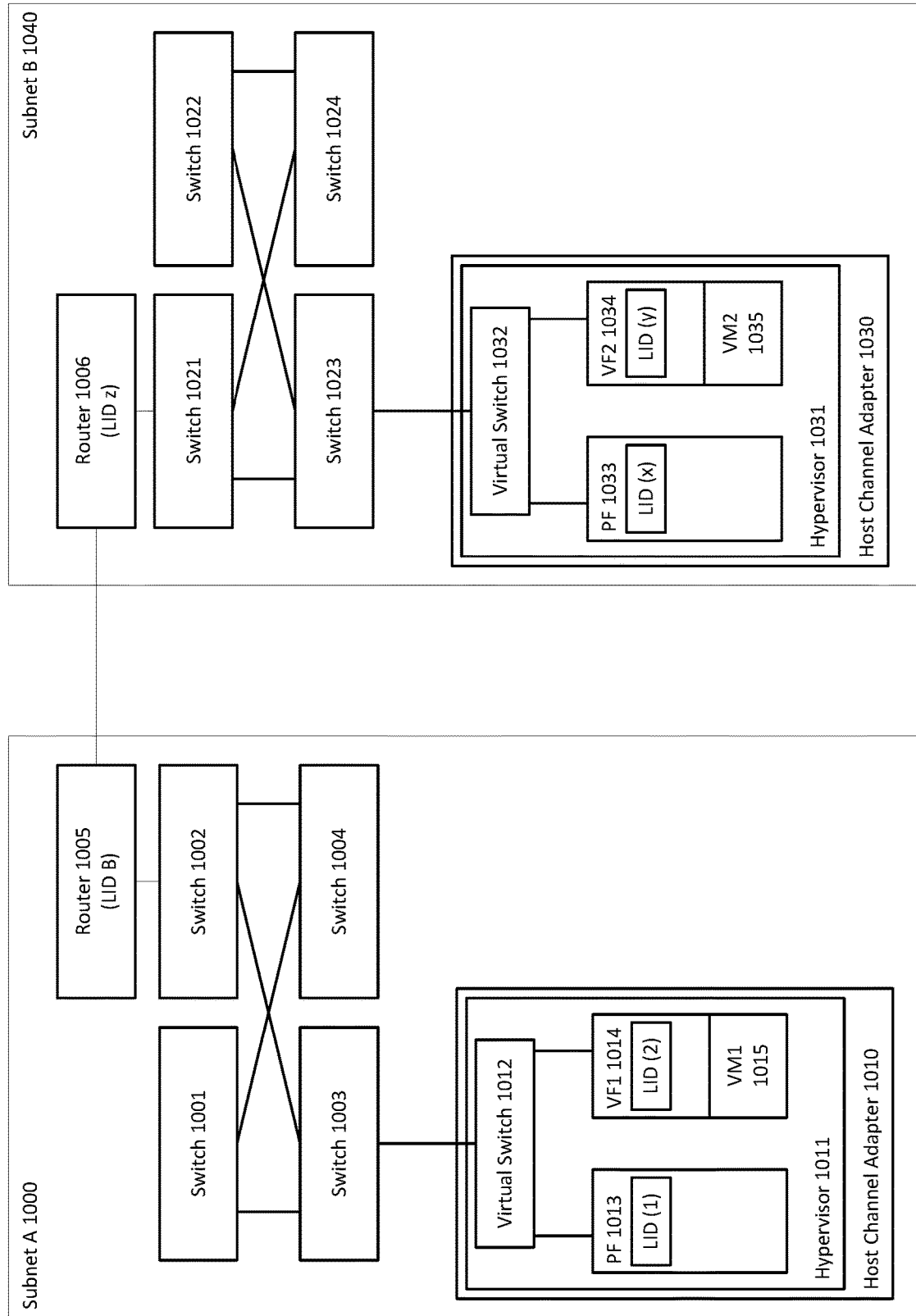
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 10105 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet b 1040 (e.g., an IB subnet) between members of a fabric, such as an InfiniBand fabric. The fabric can include a number of hardware devices, such as, for example, channel adapter 1030. Host channel adapters 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, created a fabric profile (e.g., a virtual machine fabric profile), build a virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
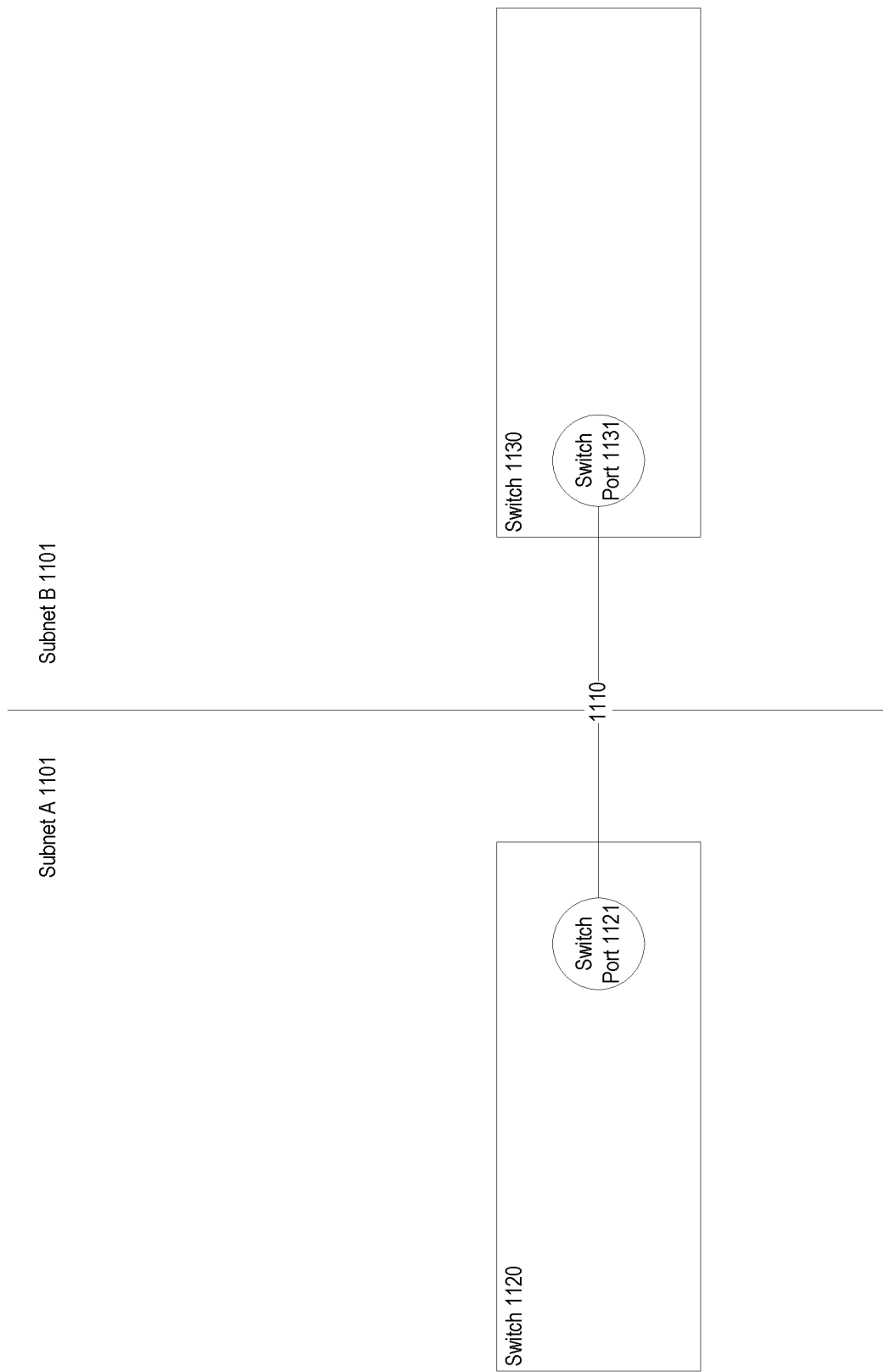
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnet A 1101 can be connected through a switch port 1121 of switch 1120, via a physical connection 1110, to a switch 1130 in subnet B 1102, via a switch port 1131 of switch 1130. In such an embodiment, each switch port, 1121 and 1131, are acting both as switch ports and router ports.

In accordance with an embodiment, a problem with this configuration is that a management entity, such as a subnet manager in an InfiniBand subnet, cannot distinguish between a physical port that is both a switch port and a router port. In such a situation, SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
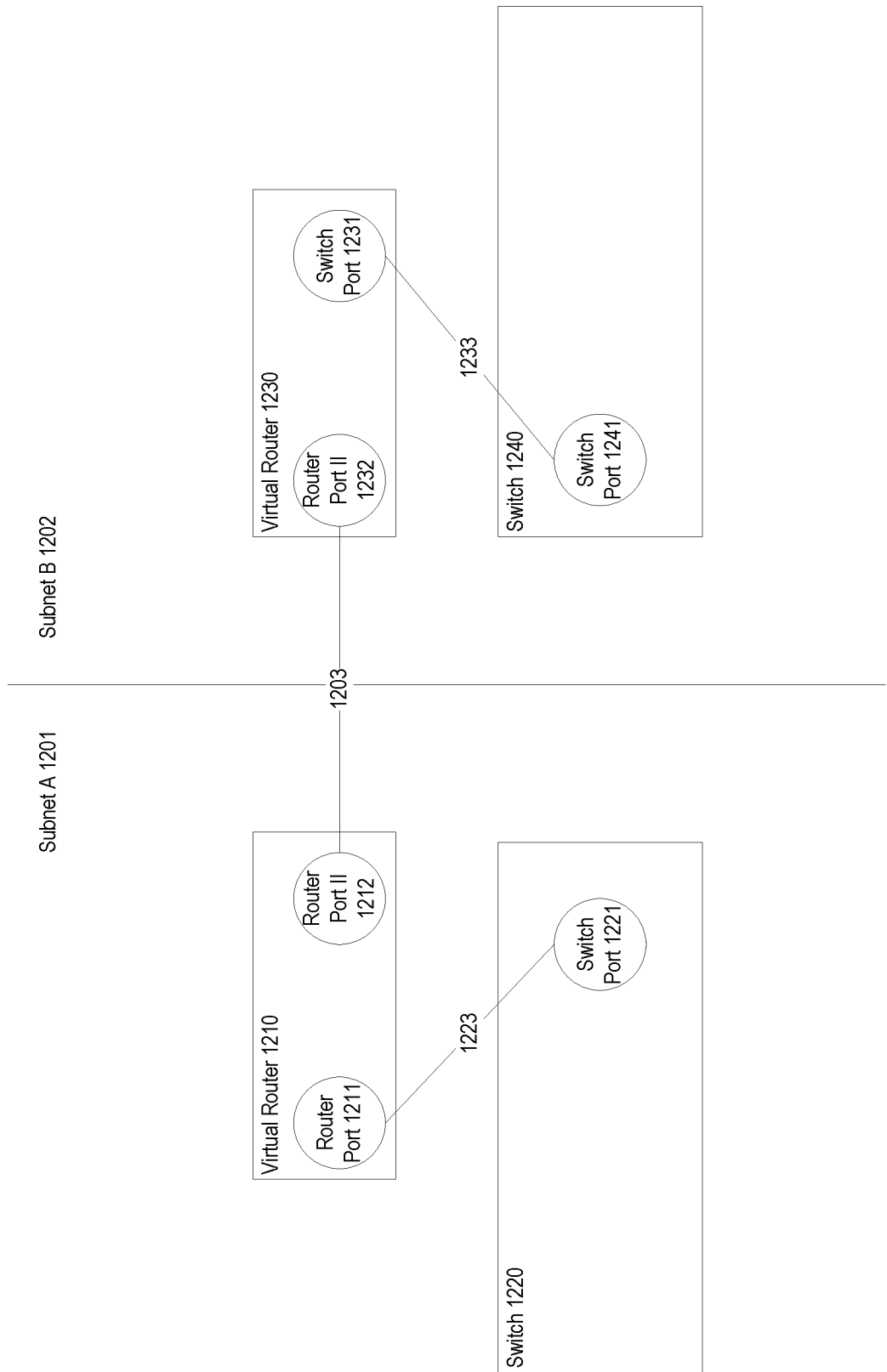
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnet A 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnet A 1201 via first end of the physical link with subnet B 1202 via a second end of the physical link, via router port II 1212 and router port II 1231, contained in virtual router 1230 in subnet B 1202. Virtual router 1230 can additionally comprise router port 1232, which can be connected (i.e., logically connected) to switch port 1241 on switch 1240 via a virtual ink 1233.

In accordance with an embodiment, a subnet manager (not shown) on subnet A can detect router port 1211, on virtual router 1210 as an end point of the subnet that the subnet manager controls. The dual-port virtual router abstraction can allow the subnet manager on subnet A want to deal with subnet A in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continued to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connect to some other switch port in the same subnet, or to a switch port that was not intended to provide a connection to another subnet. Therefore we also, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on a local side, a system does not have to provide an external, independent management entity. That is, each side of a subnet to subnet connection can be responsible for configuring its own dual-port virtual router.

In accordance with an embodiment, and additionally to the above, because each subnet is responsible for managing the local dual-port virtual router abstraction, each subnet manager is then also responsible and retains control over all data traffic within the subnet, including data traffic exiting the controlled subnet, and data traffic entering the subnet from a remote subnet.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

FIG. 13 shows a method for supporting dual-port virtual router in a high performance computing environment, in accordance with an embodiment. At step 1310, the method can provide at one or more computers, including one or more microprocessors, a first subnet, the first subnet comprising one or more switches, the one or more switches comprising at least a leaf switch, wherein each of the one or more switches comprise a plurality of switch ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the one or more switches and the plurality of host channel adapters.

At step 1320, the method can configure a switch port of the plurality of switch ports on a switch of the one or more switches as a router port.

At step 1330, the method can logically connect the switch port configured as the router port is to a virtual router, the virtual router comprising at least two virtual router ports.

Coordinated Link Up Handling Following Switch Reset

In an embodiment, when a switch in a fabric undergoes a switch reset/reboot, for any number of reasons (e.g., scheduled reboot, new firmware, updating software), problems can arise because different ports on the switch can come back online at different times. There can be, in some situations, delays on the order of seconds between when a first switch port of the switch coming back online (i.e., active link status), and when a last switch port of the switch comes back online (i.e., active link status). This can occur, for example, because link training on different switch ports of the same switch can require different amounts of time when the link logic is trying to optimize the various parameters. When different ports on a same switch come back up (i.e., achieve active link status) at different times, this can lead to confusion within the fabric.

For example, in a situation where a leaf switch, that has undergone a switch reset, has a down-going port connected to two HCAs, and several hosts via the two HCAs, achieve active link status prior to any up-going ports (that would otherwise be connected to more switches at higher switch levels), then a local subnet manager would see the leaf switch as a fully contained subnet with only one switch level. This can confuse the logic of the subnet manager, which can in turn cause other issues, which can lead to delays in getting an entire subnet/fabric back up to full functionality. The methods and systems described herein of coordinated link up handling following switch reset can alleviate such situations and improve the efficiency of such switched networks by preventing undue delay that can occur after a switch reset.

Figure 14:
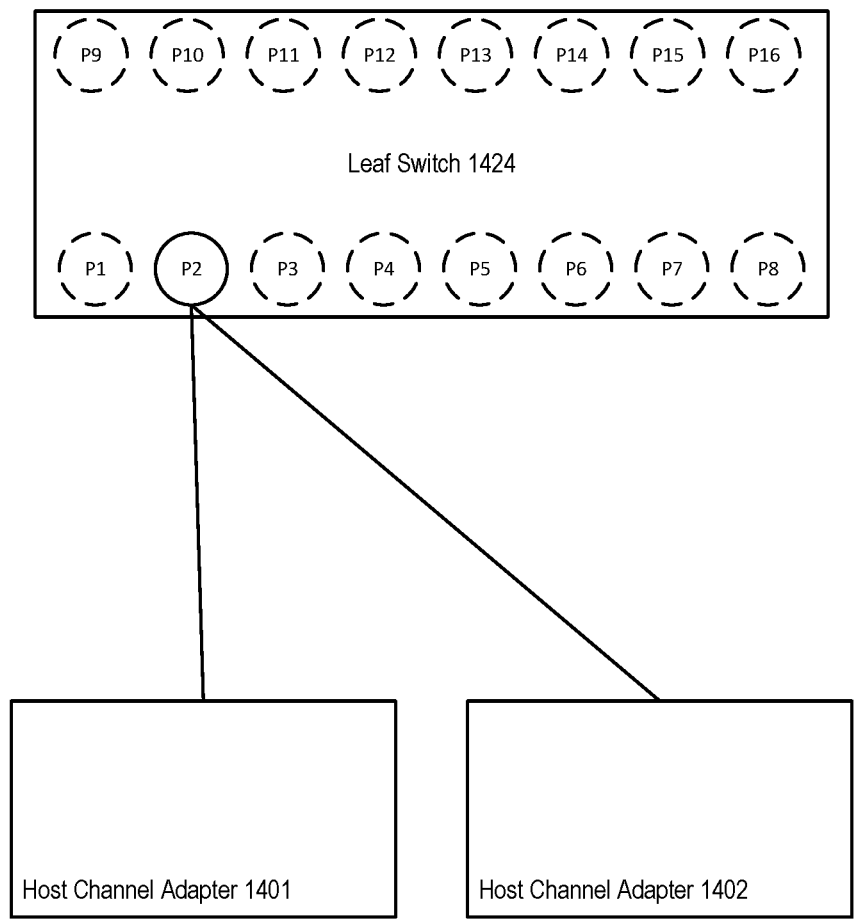
FIG. 14 illustrates a system for supporting coordinated link up handling following a switch reset in a high performance computing environment, in accordance with an embodiment.

FIG. 14 shows a system for supporting coordinated link up handing following switch reset, in accordance with an embodiment.

More specifically, FIG. 14 depicts a problem that can present itself when link up handling is not coordinated following a switch reset.

In accordance with an embodiment, within a subnet 1400, a leaf switch 1424 can be connected to two or more host channel adapters, 1401 and 1402. These HCAs can provide connectivity to the subnet 1400 to a plurality of hosts (not shown) connected to the HCAs.

In accordance with an embodiment, the leaf switch 1424 can have recently undergone a switch reset (e.g., reboot after a software update). After undergoing switch reset, the ports of leaf switch 1424, shown as P1-P16 (in actuality, a port can comprise a greater number or a lesser number of ports—only 16 ports are shown on leaf switch 1424 for the sake of simplicity), are in the process of being brought back online (link up). In the depicted example, P2 can be a first switch port of leaf switch 1424 to come back up online (i.e., train the links to HCAs 1401 and 1402), while the remaining ports, P1, and P3-P16, are still undergoing link up.

In accordance with an embodiment, when a subnet manager (e.g., a local subnet manager) gathers information about leaf switch 1424 at the depicted moment of time, the subnet manager can determine that switch port P2, within leaf switch 1424, and the connected HCAs (and their respective hosts) comprise a fully contained subnet with a single switch level, and could begin calculating routes accordingly. However, within a matter of seconds, the remaining switch ports, P1, and P3-P16, can come back up with active link status. At this point, the subnet manager can become confused, leading to delay in route allocation and calculation.

In accordance with an embodiment, systems and methods can ensure that when a leaf switch is rebooted, HCAs connected in redundant fashion to a single IB subnet with one port connected to the leaf switch being rebooted and another port to another leaf switch controlled by the current master SM do not experience a case of two master SMs (i.e., one master SM associated with each HCA port) since this may confuse the choice of active HCA port on each individual host/HCA. This can be the case even if a local SM on the rebooted switch is operational while links between the rebooted switch and other switches in the subnet have still not completed link training whereas local switch-HCA links have completed training.

In accordance with an embodiment, systems and methods can ensure that when a leaf switch is reset, all HCA ports connected to this leaf switch become operational at the same time (i.e., within an order of a few fractions of a second), even if link training times for different local switch-HCA links varies by up to several seconds.

In accordance with an embodiment, systems and methods can ensure that when any switch in an operational subnet (e.g., an InfiniBand subnet) is reset, then there will only be a single subnet re-routing and re-configuration operation after all relevant links have completed training independently of whether the link training times for different links varies by up to several seconds.

Figure 15:
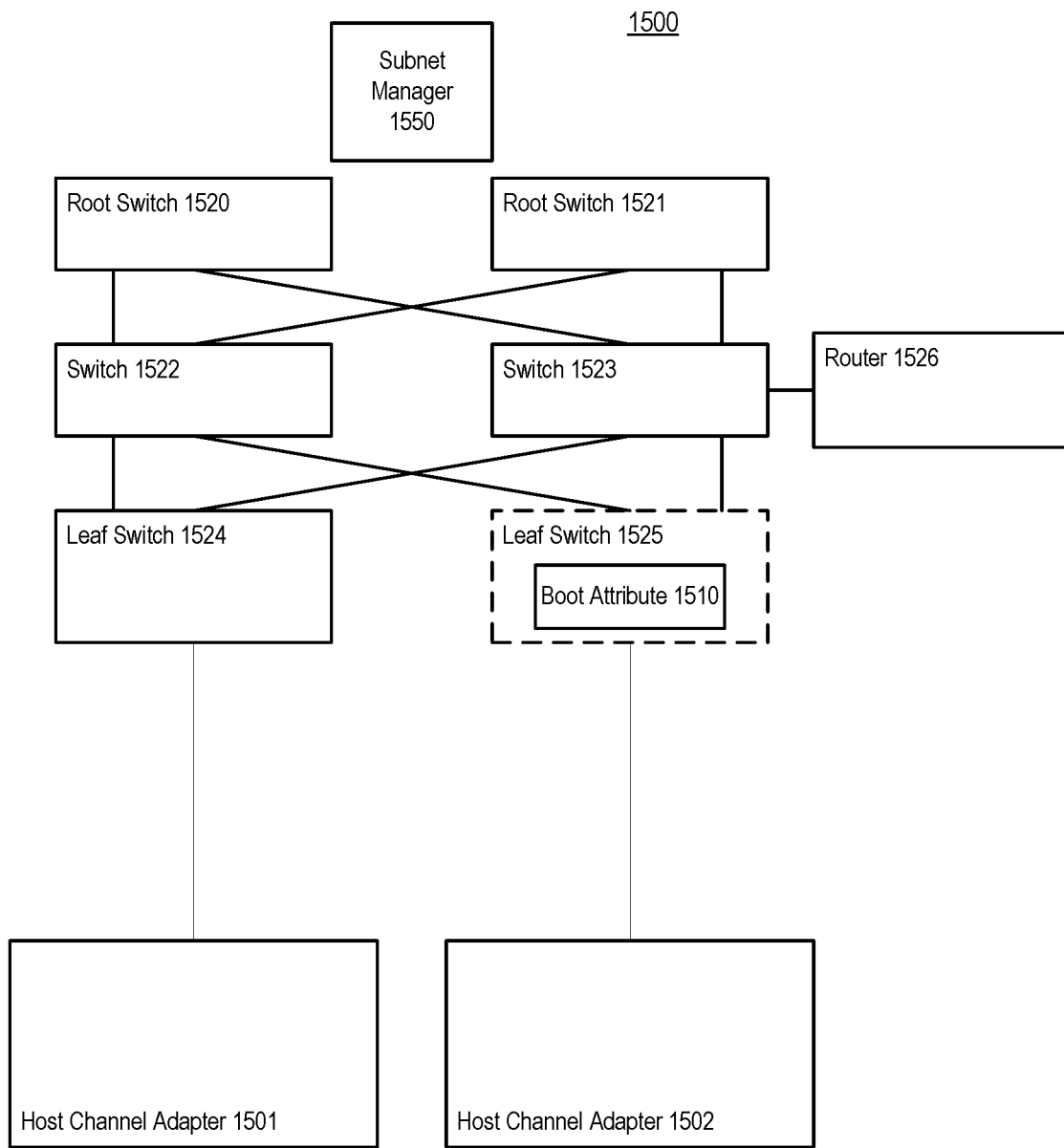
FIG. 15 illustrates a system for supporting coordinated link up handling following a switch reset in a high performance computing environment, in accordance with an embodiment.

FIG. 15 illustrates a system for supporting coordinated link up handling following a switch reset in a high performance computing environment, in accordance with an embodiment.

In accordance with an embodiment, within a subnet 1500, a number of host channel adapters 1501 and 1502, can be interconnected via a number of switches, such as switches 1520-1525. The host channel adapters can provide connectivity to the subnet to one or more hosts (not shown), wherein the hosts can comprise virtual hosts (e.g., virtual machines utilizing a SR-IOV architecture), physical hosts, or a combination of both physical and virtual hosts. As well, the subnet can host one or more routers, such as router 1526, which can provide interconnection with neighboring subnets, as described in more detail above. Such neighboring subnets can comprise a number of switches, hosts, routers, and remote subnet managers.

In accordance with an embodiment, each switch within the subnet can be associated with an attribute, such as a boot attribute. In the depicted embodiment, leaf switch 1525, has recently undergone a switch reset/reboot, and as such, it is currently associated (e.g., at the SMA or firmware of the switch) with boot attribute 1510 (e.g., "BootInProgress"). Additionally, a subnet manager 1550, as described above, can be hosted at a node within the subnet 1500. For the sake of convenience, the subnet manager 1550 is not shown as being hosted by any of the displayed nodes in the subnet. However, one of skill in the art should understand that the subnet manager 1550 is hosted on a node of the subnet, as described above.

In addition, although not shown, the subnet 1500 can be interconnected with additional other subnets, each of which can also support a SMA attribute/abstraction at router ports for inter-subnet exchange of management information.

In accordance with an embodiment, the boot attribute 1510 can comprise a number of different attributes. For the sake of convenience, only one block for the attribute is shown in the figure, but it is to be understood that the boot attribute block 1510 can comprise one or many attributes.

In accordance with an embodiment, firmware controlling leaf switch 1525 can reflect a "boot in progress" status attribute at the boot attribute 1510. This attribute can be queried both by the local SM 1550 as well as remote subnet managers (not shown) in neighboring subnets. state that can be observed by both a local SM as well as any remote SM. This state can be present as long as not all enabled local links (i.e., links connected to leaf switch 1525) have trained (i.e., not all ports expected to be active on leaf switch 1525 have been rebooted), or a maximum time for waiting for link training has been reached (i.e., a configurable timeout period). In such situations, a SM (local or remote) can detect the "boot in progress" state for switches in the subnet detected found discovery. As long as a discovered switch is in a boot in progress state, as reflected by the boot attribute, the switch can be ignored by a SM (local or remote) for at least the purposes of further discovery and may not be included in a current subnet topology.

In accordance with an embodiment, following initial discovery of a switch in "boot in progress" state, detection of change (reset) of this state can take place as the result of periodic sweeps (e.g., a sweep interval can be 10 seconds). Once the "boot in progress" state has been reset, normal discovery of the switch and associated connectivity can take place as normal. Since this happens only when all enabled links have trained, all HCA ports connected to this switch will be discovered and brought to active state during the same discovery/initiation sequence from the master SM (i.e., the link discovery for all active links on the switch happen at approximately the same time). In the case of a local SM, the same scheme will allow the local SM to start up as normal, so that it will be ready to negotiate with a remote master SM once the local "boot in progress" state has ended. In this way, there never be a period where there is a "local master" SM because links to other switches have not yet trained.

In accordance with an embodiment, in order to minimize the risk of the boot process timing out and exiting the "boot in progress" state when some links are still in the process of training, the configurable timeout value can be set to a value that is significant relative to an assumed "long time" scenario for link training. That is, for worse case values for link training of 30-40 seconds, a timeout value can be set for 50-60 seconds.

In accordance with an embodiment, since the SM in the worst case will be waiting a full sweep period (e.g., 10 seconds) before observing that the "boot in progress" state has been reset, the total time before the rebooting switch is discovered could be increased by 10-30 seconds.

In accordance with an embodiment, from the perspective of a host, this scheme will imply that the duration in which the local HCA port state stays in "Init" may be significant relative to what is normally observed. For example, if the link trains on the order of 10-20 seconds, then there could be in the order of up to more than a minute that the link will just stay in Init state before the master SM is ready to bring it to Active state.

In accordance with an embodiment, in systems and methods where vendor specific attributes are supported at the nodes (see, e.g., U.S. patent application Ser. No. 15/412,985, entitled "SYSTEM AND METHOD FOR SUPPORTING FLEXIBLE FRAMEWORK FOR EXTENDABLE SMA ATTRIBUTES IN A HIGH PERFORMANCE COMPUTING ENVIRONMENT", filed on Jan. 23, 2017, which is herein incorporated by reference) there are a few improvements that can be made when: a) a switch chip is an independent reset/reboot domain, meaning that Reboot of the SCP ("embedded management server") does not imply reset/reboot of any local switches; b) a switch firmware controls aspects of link enabling and training independently of the SCP'; c) the switch SMA is fully controlled by switch firmware and can support vendor specific attributes; and d) both local and remote SMs observe the state of both the main board switch (as well as any module based switches) via IB link(s).

In accordance with an embodiment, during a booting process, a local SMA can keep track of a "boot in progress state" that is reflected as a status attribute that can be observed by any SM (i.e., local or remote) via SMP access as long as any local link is still in the process of training.

In accordance with an embodiment, a timeout period can be provided. The timeout period can be for how long the "boot in progress state" can last during a normal reboot. The timeout period can, in an embodiment, be in the order of 50% longer than the worst case expected link training time for any type of link currently supported.

In accordance with an embodiment, ports with a link that are expected to train can be "waited for". As long as low level status info can tell that a link is not connected, or the remote side is not operational, then this link should not be considered by the "wait" logic.

In accordance with an embodiment, links that correspond to ports represented by the switch SMA instances can be considered by the "boot in progress state" handling. For example, when virtual router ports are defined, then the relevant physical link from the corresponding switch port will not be considered whereas the virtual link between the switch port and the virtual router port will always have physical state "up".

In accordance with an embodiment, a vendor specific attribute can be defined, such as "BootInProgressStatus." The vendor specific attribute capability mask can define if this new attribute is supported. As long as the relevant capability is not supported then the SM will discover the switch and associated connectivity as normal. An SM will not use NodeDescription value for detecting "boot in progress" status for nodes with a specific vendor ID. The SM can use NodeDescription value for detecting "boot in progress" status for switch nodes that do not have vendor specific ID.

In accordance with an embodiment, the vendor specific attribute (i.e., "BootInProgressStatus") can have the following components:

BootInProgressFlag—this can be a Boolean value that reflects a "number of ports currently waited for is non-zero, but it is up to the implementation to decide if other local state will contribute to still being in "boot in progress" state.

The number of ports currently waited for (i.e., where links are still expected to train)

The number of ports that have been given up to wait for (i.e., failed to train)

The wait timeout value in milliseconds

The remaining max wait time in milliseconds

The total wait time so far

The "total wait time so far" will normally be the timeout value minus the remaining time. However, in the exception case below, this time may be longer.

In accordance with an embodiment, while the "boot in progress" status is active, the switch instance may (in principle) accept both in-band and out-of-band requests to enable or disable a physical link. If a previously disabled link is enabled, then the wait timeout can be reset, and this can be reflected by the relevant time value components In accordance with an embodiment, any SM that "probes" the switch instance via any operational port can use the "BootInProgressFlag" component as the boolean status defining if further discovery of this switch and inclusion in the subnet topology should take place at this time.

In accordance with an embodiment, other components can be used for informational purposes and can also be used to monitor progress. The SM instance can determine if lack of progress within an SM defined period will cause the SM to report a problem. However, the SM should not initiate any further discovery of the switch connectivity as long as the switch is still reporting "boot in progress" status.

Figure 16:
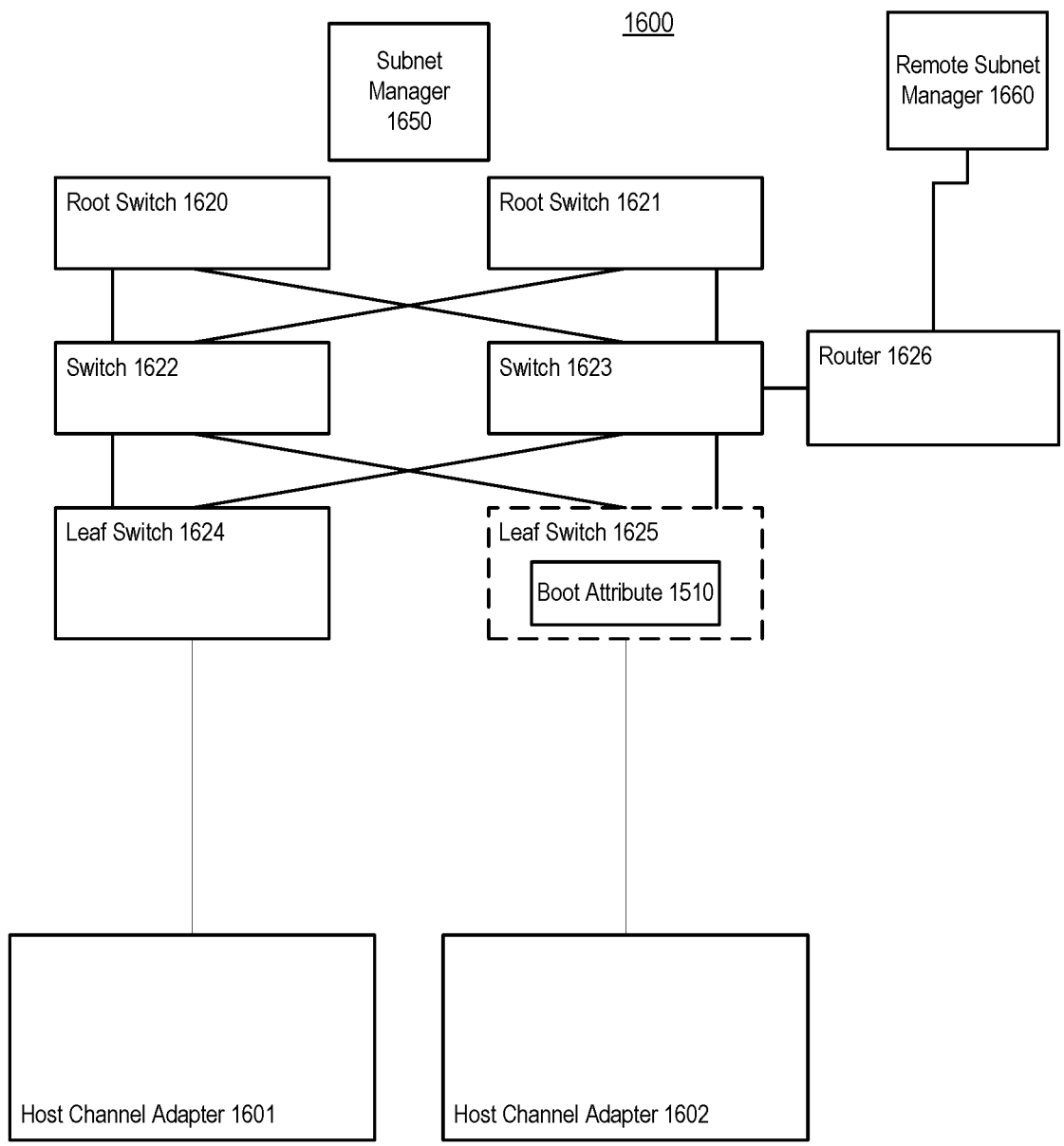
FIG. 16 illustrates a system for supporting coordinated link up handling following a switch reset in a high performance computing environment, in accordance with an embodiment.

FIG. 16 illustrates a system for supporting coordinated link up handling following a switch reset in a high performance computing environment, in accordance with an embodiment.

In accordance with an embodiment, within a subnet 1600, a number of host channel adapters 1601 and 1602, can be interconnected via a number of switches, such as switches 1620-1625. The host channel adapters can provide connectivity to the subnet to one or more hosts (not shown), wherein the hosts can comprise virtual hosts (e.g., virtual machines utilizing a SR-IOV architecture), physical hosts, or a combination of both physical and virtual hosts. As well, the subnet can host one or more routers, such as router 1626, which can provide interconnection with neighboring subnets, as described in more detail above. Such neighboring subnets can comprise a number of switches, hosts, routers, and remote subnet managers, such as remote subnet manager 1660.

In accordance with an embodiment, each switch within the subnet can be associated with an attribute, such as a boot attribute. In the depicted embodiment, leaf switch 1625, has recently undergone a switch reset/reboot, and as such, it is currently associated (e.g., at the SMA or firmware of the switch) with boot flag 1610 (e.g., "BootInProgressFlag") that can be a vendor specific SMA attribute. Additionally, a subnet manager 1650, as described above, can be hosted at a node within the subnet 1600. For the sake of convenience, the subnet manager 1650 is not shown as being hosted by any of the displayed nodes in the subnet. However, one of skill in the art should understand that the subnet manager 1650 is hosted on a node of the subnet, as described above.

In addition, although not shown, the subnet 1600 can be interconnected with additional other subnets, each of which can also support a SMA attribute/abstraction at router ports for inter-subnet exchange of management information.

In accordance with an embodiment, the boot flag 1610 can comprise a number of different attributes. For the sake of convenience, only one block for the attribute is shown in the figure, but it is to be understood that the boot flag 1610 can comprise one or many attributes.

In accordance with an embodiment, such attributes, which can be queried by a local or remote subnet manager, can comprise one or more of: a) a BootInProgressFlag—this can be a Boolean value that reflects a "number of ports currently waited for is non-zero, but it is up to the implementation to decide if other local state will contribute to still being in "boot in progress" state; b) a number of ports at the node currently waited for (i.e., where links are still expected to train); c) a number of ports at the node that have been given up to wait for; d) a wait timeout value in milliseconds; d) the remaining max wait time in milliseconds; e) the total wait time so far, which can be calculated as the timeout value minus the remaining time.

FIG. 17 is a flow chart of a method for supporting coordinated link up handling following a switch reset in a high performance computing environment, in accordance with an embodiment.

At step 1710, the method can provide, at the one or more computers, including one or more microprocessors a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one virtual function, at least one virtual switch, and at least one physical function, and wherein the plurality of host channel adapters are interconnected via the plurality of switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the plurality of switches and the plurality of host channel adapters.

At 1720, the method can reset a switch of the plurality of switches.

At 1730, upon the reset of the switch of the plurality of switches, the method can associate the switch with a boot attribute, the boot attribute being accessible, via a subnet management packet, by at least the subnet manager.

Controlled Re-Cabling and Link Testing for Switches and Switch Ports

In accordance with an embodiment, systems and methods can provide a switch mode that is similar to "boot in progress", but that is admin (e.g., administrator) controllable. This mode can ensure that an admin can perform re-cabling and cable test operations for any single switch in an operational subnet (e.g., an InfiniBand subnet) without causing unnecessary subnet re-routing and re-configuration operations.

In accordance with an embodiment, a first option provides that all current routes through a switch in a subnet can immediately be moved to another switch (if possible), and all CA ports can be set to initialize (INIT) state in order to prevent further data traffic. When this switch mode is turned off, the switch and any trained links can be included in the operational IB subnet, similar to a situation where "boot in progress" state for a switch is turned off.

In accordance with an embodiment, this mode facilitates that a switch can be included in an operational IB subnet, and can be dynamically cabled up without causing any inconsistent routing or re-routing of any intermediate topologies while allowing connectivity and link stability to be checked dynamically. The behavior for this mode is equivalent to having the "boot in progress" state be turned on by default during initial installation or cable testing, and not be turned off until explicitly requested by the admin. However, to avoid overloading the "boot in progress" state, an explicit unique state can be used.

In accordance with an embodiment, a second option provides that all current routes through operational (Active) ports can remain active as long as the physical link stays up. Whenever a port is in non-active state, a master SM will not bring it (back) to Active state independently (e.g., irrespective) of whether the port has successfully trained or not. Hence, any further state changes for the port (e.g. it can be connected and disconnected multiple times) will not cause the master SM to consider it for inclusion in the operational subnet.

In accordance with an embodiment, whenever such mode is turned off, any currently trained links can be included in the operational subnet (again). This mode can facilitate selective re-cabling or cable testing associated with a specific switch.

In accordance with an embodiment, a third option acts similarly to the first option, but is different in that it only applies to specified ports (e.g., specified by an admin, or a SM) or individual port numbers rather than a complete switch.

In accordance with an embodiment, one, two, or all three options can be supported.

In accordance with an embodiment, a switch side implementation can leverage the implementation of a "boot in progress" state in that either additional information can be added to the "boot in progress" attribute, or that additional special value strings could be defined for a "NodeDescription" string attribute.

In accordance with an embodiment, such new states can have both a persistent and a non-persistent mode, and would be in addition to and not instead of the "boot in progress" state.

In accordance with an embodiment, since the additional states are admin controllable, corresponding management interfaces can be provided.

In accordance with an embodiment, additional logic is added to subnet managers as an extension to the "boot in progress" logic. The "boot in progress" state can have priority since it implies that all links are ignored and it is always present after any complete switch reset.

Figure 18:
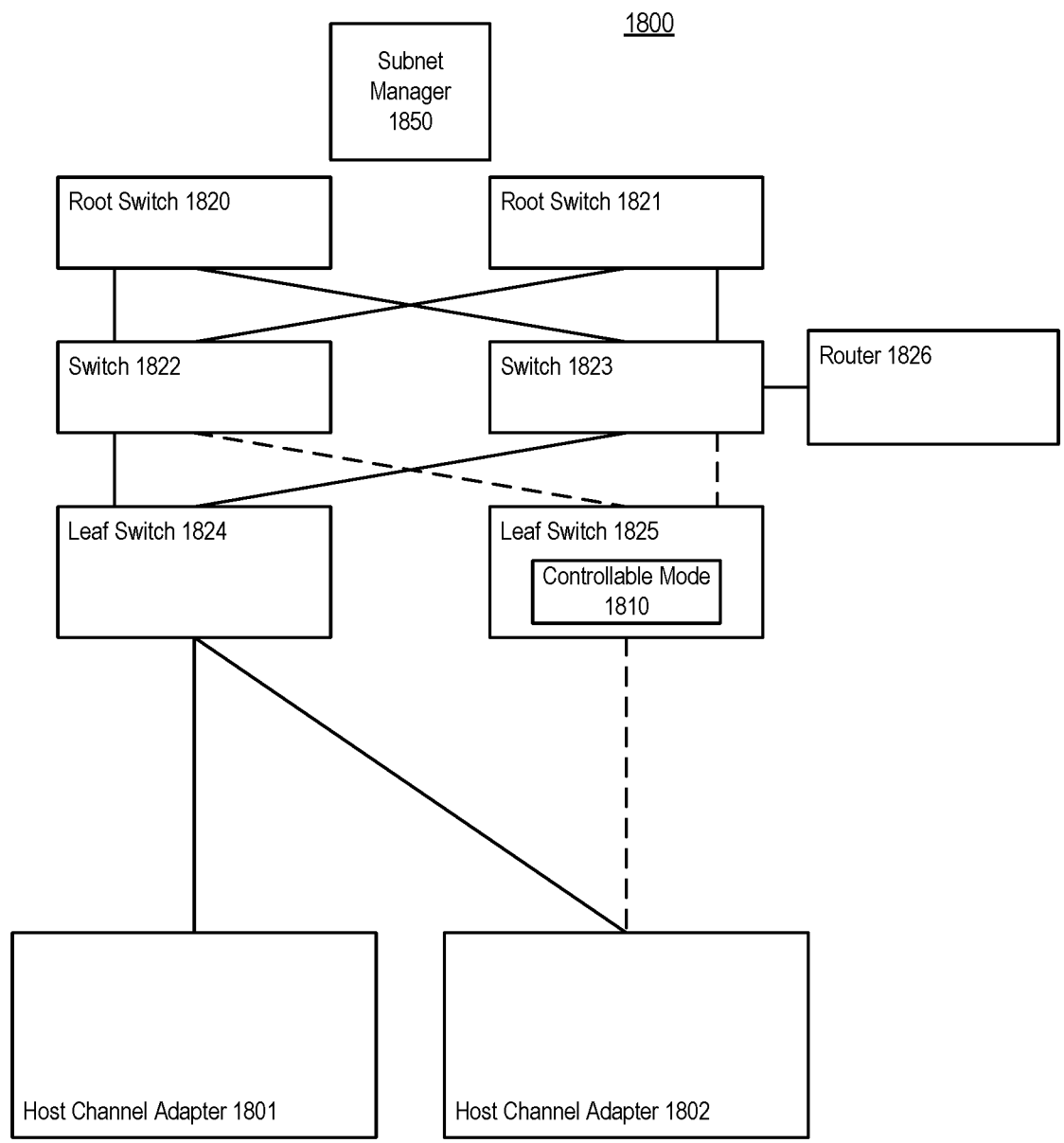
FIG. 18 illustrates a system for supporting controlled re-cabling and link testing for switches and switch ports in a high performance computing environment, in accordance with an embodiment.

FIG. 18 illustrates a system for supporting controlled re-cabling and link testing for switches and switch ports in a high performance computing environment, in accordance with an embodiment.

In accordance with an embodiment, within a subnet 1800, a number of host channel adapters 1801 and 1802, can be interconnected via a number of switches, such as switches 1820-1825. The host channel adapters can provide connectivity to the subnet to one or more hosts (not shown), wherein the hosts can comprise virtual hosts (e.g., virtual machines utilizing a SR-IOV architecture), physical hosts, or a combination of both physical and virtual hosts. As well, the subnet can host one or more routers, such as router 1826, which can provide interconnection with neighboring subnets, as described in more detail above. Such neighboring subnets can comprise a number of switches, hosts, routers, and remote subnet managers.

In accordance with an embodiment, each switch within the subnet can be associated with an attribute, such as controllable attribute 1810. In the depicted embodiment, leaf switch 1825 is either recently installed in the subnet, or is undergoing complete link re-cabling or testing, and as such, it is currently associated (e.g., at the SMA or firmware of the switch) with controllable attribute 1810. Additionally, a subnet manager 1850, as described above, can be hosted at a node within the subnet 1800. For the sake of convenience, the subnet manager 1850 is not shown as being hosted by any of the displayed nodes in the subnet. However, one of skill in the art should understand that the subnet manager 1850 is hosted on a node of the subnet, as described above.

In accordance with an embodiment, a switch, such as leaf switch 1825, can undergo re-cabling and link testing for the entire switch, or only portion of the switch ports within switch 1825. When this occurs, an administrator controllable mode 1810 (such as an administrator controllable boot-in-progress mode) can be initiated at the switch 1825, or at one or more of the switch ports at switch 1825.

In accordance with an embodiment, the controllable mode 1810 can allow an administrator to perform re-cabling and cable test operations for switch 1825 in the operational subnet 1800 without causing unnecessary subnet re-routing and re-configuration operations.

In accordance with an embodiment, upon initiation of the controllable mode 1810 at switch 1825, all current routes through switch 1825 can be moved to another switch, such as a switch selected from switch 1820 through switch 1824. This is shown as the dashed links in the figure depicting non-active links. In addition, all channel adapter ports can be set to initialize (INIT) state in order to prevent further data traffic. When this switch mode is turned off, the switch and any trained links can be included in the operational IB subnet, similar to a situation where "boot in progress" state for a switch is turned off.

In accordance with an embodiment, in addition to supporting the above situations, the controllable mode can additionally support a further embodiment where only a portion of the ports on a switch become inactive. In such a situation, current routes through operational (Active) ports can remain active as long as the physical link stays up. Whenever a port is in non-active state, a master SM will not bring it (back) to Active state independently (e.g., irrespective) of whether the port has successfully trained or not. Hence, any further state changes for the port (e.g. it can be connected and disconnected multiple times) will not cause the master SM to consider it for inclusion in the operational subnet.

Figure 19:
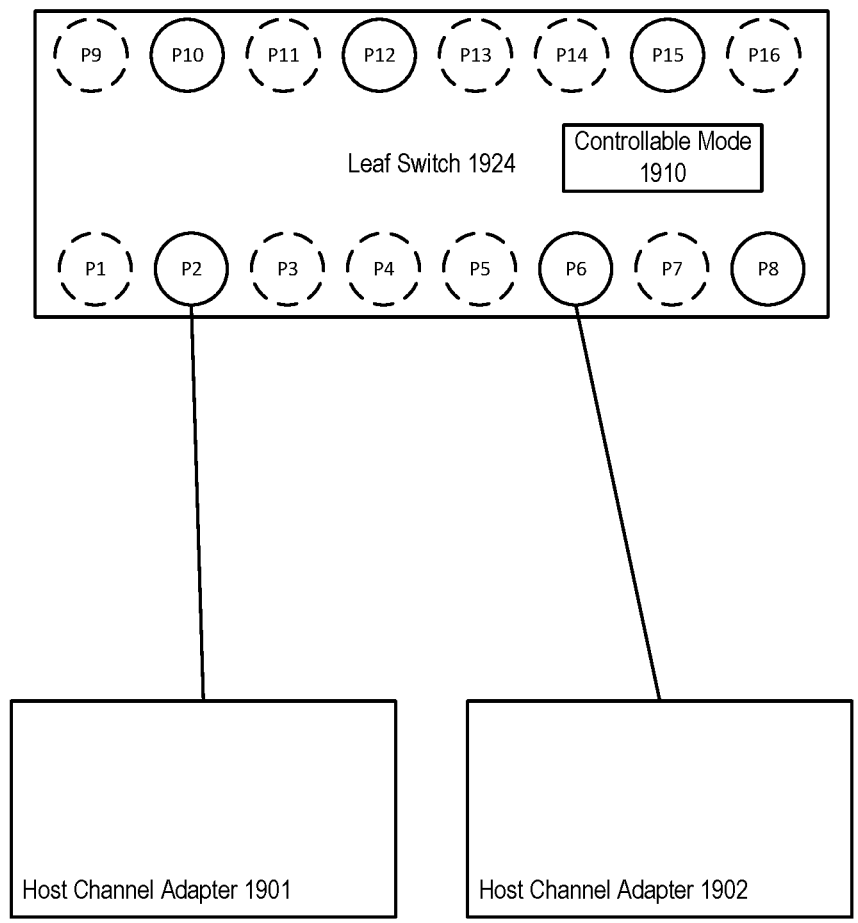
FIG. 19 illustrates a system for supporting controlled re-cabling and link testing for switches and switch ports in a high performance computing environment, in accordance with an embodiment.

FIG. 19 illustrates a system for supporting controlled re-cabling and link testing for switches and switch ports in a high performance computing environment, in accordance with an embodiment.

More specifically, FIG. 19 illustrates an option for supporting controlled re-cabling and link testing for switches when not all ports of a switch are inactive/testing/being re-cabled.

In accordance with an embodiment, within a subnet 1900, a leaf switch 1924 can be connected to two or more host channel adapters, 1901 and 1902. These HCAs can provide connectivity to the subnet 1900 to a plurality of hosts (not shown) connected to the HCAs.

In accordance with an embodiment, certain switch ports of leaf switch 1924 are inactive for certain reasons (e.g., are undergoing link testing, are being re-cabled . . . etc.). In such a situation, a controllable mode 1910 can be invoked at the switch. The controllable mode can provide a subnet manager or master SM to allow all active ports and links to remain active as long as the physical link stays up. Whenever a port is in non-active state, a SM or master SM will not bring it (back) to Active state independently (e.g., irrespective) of whether the port has successfully trained or not. Hence, any further state changes for the port (e.g. it can be connected and disconnected multiple times) will not cause the master SM to consider it for inclusion in the operational subnet.

In the depicted embodiment, then, all ports that comprise a dashed line (i.e., ports P1, P3-P5, P7, P9, P11, P13, P14, and P16) are inactive due to undergoing re-cabling or link testing. The ports that comprise a solid line are active (i.e., ports P2, P6, P8, P10, P12, and P15). The controllable mode can allow all active ports, that is ports P2, P6, P8, P10, P12, and P15, to remain active so long as the links associated with those ports remain active and can be included in SM and master SM discovery and routing calculations for the subnet. Conversely, those ports that are inactive, ports P1, P3-P5, P7, P9, P11, P13, P14, and P16, due to the controllable mode setting, will remain inactive (in view of the SM or master SM) for as long as the controllable mode is associated with the switch (that is until the controllable mode is cleared). In such situations, then, those ports that are inactive will remain inactive in the view of the SM or master SM, and will not be included, for example, in SM or master SM discovery and routing calculations.

In such a way, then, those ports that are inactive can undergo prolonged re-cabling or link-testing without impacting SM or master SM activities. As such, this provides for enhanced subnet efficiency as without such a controllable mode, such ports would continually be added and removed from the SM and master SM calculations for the subnet, which would have a detrimental impact on both the SM and master SM, as well as on the route calculations for the subnet.

Figure 20:
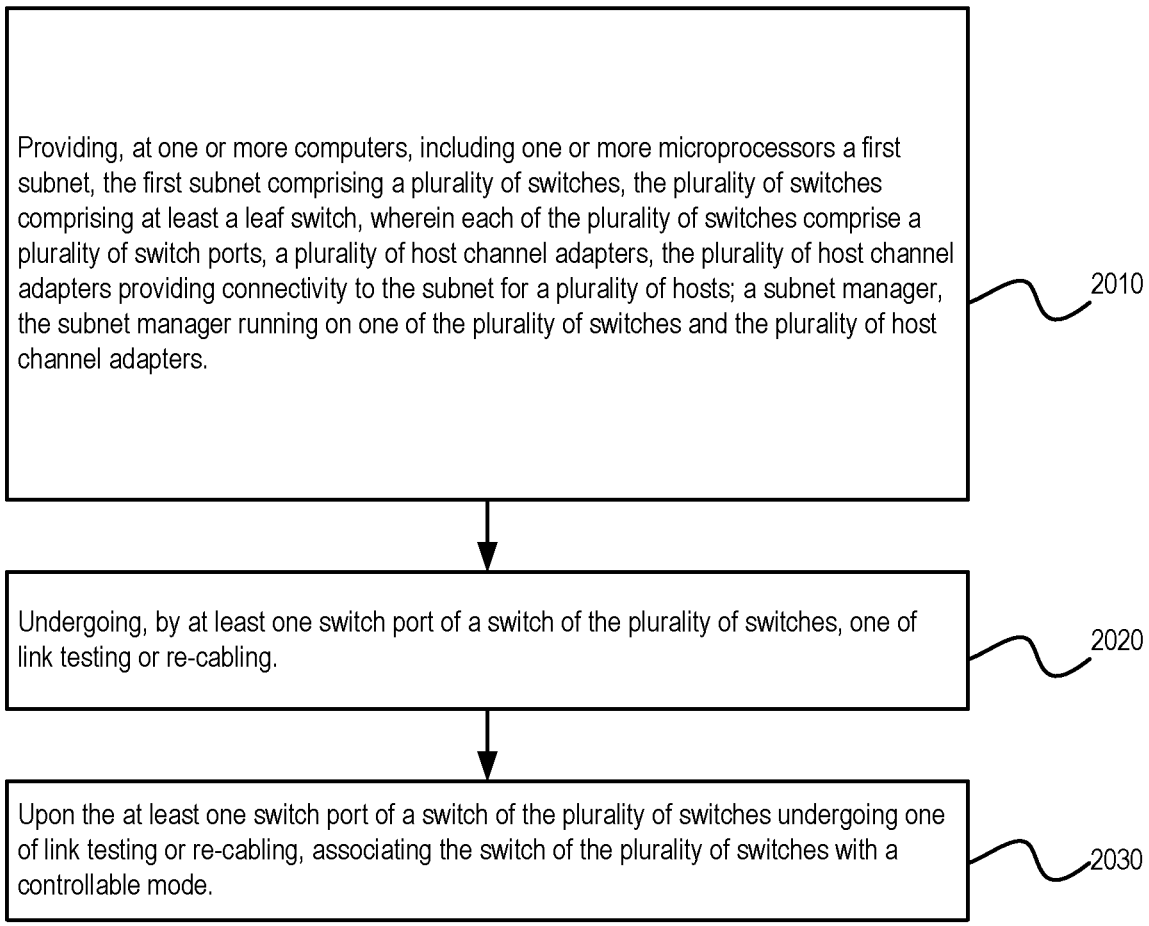
FIG. 20 is a flow chart of a method for supporting controlled re-cabling and link testing for switches and switch ports in a high performance computing environment, in accordance with an embodiment.

FIG. 20 is a flow chart of a method for supporting controlled re-cabling and link testing for switches and switch ports in a high performance computing environment, in accordance with an embodiment.

At step 2010, the method can provide, at one or more computers, including one or more microprocessors a first subnet, the first subnet comprising a plurality of switches, the plurality of switches comprising at least a leaf switch, wherein each of the plurality of switches comprise a plurality of switch ports, a plurality of host channel adapters, the plurality of host channel adapters providing connectivity to the subnet for a plurality of hosts; a subnet manager, the subnet manager running on one of the plurality of switches and the plurality of host channel adapters.

At step 2020, the method can undergo, by at least one switch port of a switch of the plurality of switches, one of link testing or re-cabling.

At step 2030, upon the at least one switch port of a switch of the plurality of switches undergoing one of link testing or re-cabling, the method can associate the switch of the plurality of switches with a controllable mode.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting controlled re-cabling and link testing for switches and switch ports in a high performance computing environment, comprising:
   one or more microprocessors;
   a first subnet, the first subnet comprising
      a plurality of switches, the plurality of switches comprising at least a leaf switch, wherein each of the plurality of switches comprise a plurality of switch ports,
      a plurality of host channel adapters, the plurality of host channel adapters providing connectivity to the subnet for a plurality of hosts;
      a subnet manager, the subnet manager running on one of the plurality of switches and the plurality of host channel adapters;
   wherein a set of the plurality of switch ports at a switch of the plurality of switches undergoes one of link testing or re-cabling, wherein the set of switch ports undergoing one of link testing or re-cabling comprises a number of switch ports smaller than the plurality of switch ports of the switch;
   wherein upon the set of the plurality of switch ports of the switch of the plurality of switches undergoing one of link testing or re-cabling, the switch of the plurality of switches is associated with a controllable mode;
   wherein the controllable mode deactivates, with regard to the subnet manager, each of the set of switch ports undergoing one of link testing or re-cabling such that only those switch ports not of the set of switch ports are included in management operations of the subnet manager; and
   wherein upon deactivation of each of the set of switch ports of the switch of the plurality of switches, all routes previously routed through each of the set of switch ports of the switch of the plurality of switches is re-directed, via the subnet manager.

2. The system of claim 1,
   wherein upon deactivation of each of the set of switch ports of the switch of the plurality of switches, all ports associated with active links remain active.

3. The system of claim 2, wherein upon completion of the one of link testing or re-cabling for each of the set of switch ports, the controllable mode is disassociated with the switch of the plurality of switches; and
   wherein upon the controllable mode being disassociated with the switch, each of the plurality of switch ports of the switch are included in management operations of the subnet manager.

4. The system of claim 1,
   wherein each of the host channel adapters comprise at least one virtual function, at least one virtual switch, and at least one physical function, and wherein the plurality of host channel adapters are interconnected via the plurality of switches;
   wherein the first subnet further comprises a plurality of hypervisors, wherein each of the plurality of hypervisors are associated with at least one host channel adapter of the plurality of host channel adapters; and
   wherein the plurality of hosts comprise a plurality of virtual machines, wherein each of the plurality of virtual machines are associated with at least one virtual function.

5. The system of claim 2,
   wherein each of the host channel adapters comprise at least one virtual function, at least one virtual switch, and at least one physical function, and wherein the plurality of host channel adapters are interconnected via the plurality of switches;
   wherein the first subnet further comprises a plurality of hypervisors, wherein each of the plurality of hypervisors are associated with at least one host channel adapter of the plurality of host channel adapters; and
   wherein the plurality of hosts comprise a plurality of virtual machines, wherein each of the plurality of virtual machines are associated with at least one virtual function.

6. The system of claim 1,
   wherein the first subnet comprises an InfiniBand subnet.

7. A method for supporting controlled re-cabling and link testing for switches and switch ports in a high performance computing environment, comprising:
   providing, at one or more computers, including one or more microprocessors
      a first subnet, the first subnet comprising
         a plurality of switches, the plurality of switches comprising at least a leaf switch, wherein each of the plurality of switches comprise a plurality of switch ports,
         a plurality of host channel adapters, the plurality of host channel adapters providing connectivity to the subnet for a plurality of hosts;
         a subnet manager, the subnet manager running on one of the plurality of switches and the plurality of host channel adapters;
   undergoing, by a set of the plurality of switch ports at a switch of the plurality of switches, one of link testing or re-cabling, wherein the set of switch ports undergoing one of link testing or re-cabling comprises a number of switch ports smaller than the plurality of switch ports of the switch; and
   upon the set of the plurality of switch ports of the switch of the plurality of switches undergoing one of link testing or re-cabling, associating the switch of the plurality of switches with a controllable mode;
   wherein the controllable mode deactivates, with regard to the subnet manager, each of the set of switch ports undergoing one of link testing or re-cabling such that only those switch ports not of the set of switch ports are included in management operations of the subnet manager; and
   wherein upon deactivation of each of the set of switch ports of the switch of the plurality of switches, all routes previously routed through each of the set of switch ports of the switch of the plurality of switches is re-directed, via the subnet manager.

8. The method of claim 7,
   wherein upon deactivation of each of the set of switch ports of the switch of the plurality of switches, all ports associated with active links remain active.

9. The method of claim 8, wherein upon completion of the one of link testing or re-cabling for each of the set of switch ports, the controllable mode is disassociated with the switch of the plurality of switches; and wherein upon the controllable mode being disassociated with the switch, each of the plurality of switch ports of the switch are included in management operations of the subnet manager.

10. The method of claim 7,
wherein each of the host channel adapters comprise at least one virtual function, at least one virtual switch, and at least one physical function, and wherein the plurality of host channel adapters are interconnected via the plurality of switches;
wherein the first subnet further comprises a plurality of hypervisors, wherein each of the plurality of hypervisors are associated with at least one host channel adapter of the plurality of host channel adapters; and
wherein the plurality of hosts comprise a plurality of virtual machines, wherein each of the plurality of virtual machines are associated with at least one virtual function.

11. The method of claim 9,
wherein each of the host channel adapters comprise at least one virtual function, at least one virtual switch, and at least one physical function, and wherein the plurality of host channel adapters are interconnected via the plurality of switches;
wherein the first subnet further comprises a plurality of hypervisors, wherein each of the plurality of hypervisors are associated with at least one host channel adapter of the plurality of host channel adapters; and
wherein the plurality of hosts comprise a plurality of virtual machines, wherein each of the plurality of virtual machines are associated with at least one virtual function.

12. The method of claim 7,
wherein the first subnet comprises an InfiniBand subnet.

13. A non-transitory computer readable storage medium having instructions thereon for supporting controlled re-cabling and link testing for switches and switch ports in a high performance computing environment, which when read and executed by one or more computers cause the one or more computers to perform the steps comprising:
providing, at one or more computers, including one or more microprocessors
a first subnet, the first subnet comprising
a plurality of switches, the plurality of switches comprising at least a leaf switch, wherein each of the plurality of switches comprise a plurality of switch ports,
a plurality of host channel adapters, the plurality of host channel adapters providing connectivity to the subnet for a plurality of hosts;
a subnet manager, the subnet manager running on one of the plurality of switches and the plurality of host channel adapters;
undergoing, by a set of the plurality of switch ports at a switch of the plurality of switches, one of link testing or re-cabling, wherein the set of switch ports undergoing one of link testing or re-cabling comprises a number of switch ports smaller than the plurality of switch ports of the switch; and
upon the set of the plurality of switch ports of the switch of the plurality of switches undergoing one of link testing or re-cabling, associating the switch of the plurality of switches with a controllable mode;
wherein the controllable mode deactivates, with regard to the subnet manager, each of the set of switch ports undergoing one of link testing or re-cabling such that only those switch ports not of the set of switch ports are included in management operations of the subnet manager; and
wherein upon deactivation of each of the set of switch ports of the switch of the plurality of switches, all routes previously routed through each of the set of switch ports of the switch of the plurality of switches is re-directed, via the subnet manager.

14. The non-transitory computer readable storage medium of claim 13,
wherein upon deactivation of each of the set of switch ports of the switch of the plurality of switches, all ports associated with active links remain active.

15. The non-transitory computer readable storage medium of claim 14,
wherein upon completion of the one of link testing or re-cabling for each of the set of switch ports, the controllable mode is disassociated with the switch of the plurality of switches; and
wherein upon the controllable mode being disassociated with the switch, each of the plurality of switch ports of the switch are included in management operations of the subnet manager.

16. The non-transitory computer readable storage medium of claim 13,
wherein each of the host channel adapters comprise at least one virtual function, at least one virtual switch, and at least one physical function, and wherein the plurality of host channel adapters are interconnected via the plurality of switches;
wherein the first subnet further comprises a plurality of hypervisors, wherein each of the plurality of hypervisors are associated with at least one host channel adapter of the plurality of host channel adapters; and
wherein the plurality of hosts comprise a plurality of virtual machines, wherein each of the plurality of virtual machines are associated with at least one virtual function.

17. The non-transitory computer readable storage medium of claim 14,
wherein each of the host channel adapters comprise at least one virtual function, at least one virtual switch, and at least one physical function, and wherein the plurality of host channel adapters are interconnected via the plurality of switches;
wherein the first subnet further comprises a plurality of hypervisors, wherein each of the plurality of hypervisors are associated with at least one host channel adapter of the plurality of host channel adapters; and
wherein the plurality of hosts comprise a plurality of virtual machines, wherein each of the plurality of virtual machines are associated with at least one virtual function.

18. The system of claim 1,
wherein a subset of the set of switch ports of the plurality of switch ports complete the at least one of link testing or re-cabling;
wherein upon the subset of the set of switch ports completion of the at least one of link testing or re-cabling, the subnet of the set of switch ports remain inactive, with regard to the subnet manager.

19. The method of claim 7,
wherein a subset of the set of switch ports of the plurality of switch ports complete the at least one of link testing or re-cabling;
wherein upon the subset of the set of switch ports completion of the at least one of link testing or re-cabling, the subnet of the set of switch ports remain inactive, with regard to the subnet manager.

20. The non-transitory computer readable storage medium of claim 13,
wherein a subset of the set of switch ports of the plurality of switch ports complete the at least one of link testing or re-cabling;
wherein upon the subset of the set of switch ports completion of the at least one of link testing or re-cabling, the subnet of the set of switch ports remain inactive, with regard to the subnet manager.

* * * * *